United States Patent [19]

Williamson

[11] Patent Number: 5,468,381
[45] Date of Patent: Nov. 21, 1995

[54] MAGNETIC FILTER ADAPTER

[76] Inventor: Carlton R. Williamson, 1117 Henson Dr., Hurst, Tex. 76053

[21] Appl. No.: 251,839

[22] Filed: May 31, 1994

[51] Int. Cl.[6] .................................................. B01D 35/06
[52] U.S. Cl. ............................ 210/223; 184/6.25; 335/304
[58] Field of Search ..................................... 210/222, 223; 335/302, 304, 303, 305; 184/6.25

[56] References Cited

U.S. PATENT DOCUMENTS 3,899,762  8/1975  Studders ................................. 335/302
4,529,517  7/1985  Bertil ..................................... 210/223

Primary Examiner—Matthew O. Savage
Attorney, Agent, or Firm—Uland & Associates

[57] ABSTRACT

An improved magnetic filter adapter for use with removable fluid system filters. The magnetic filter adapter of the present invention includes an adaptive filter housing removably mountable to a fluid system filter, magnet means for attracting metallic particles from the fluid flow within the filter toward the interior surface of the filter external wall, and an inner magnetic-field concentrating cup for concentrating the magnetic force of said magnet means such that the potential field strength of the magnet means is optimized.

20 Claims, 1 Drawing Sheet

MAGNETIC FILTER ADAPTER

RELATED DISCLOSURE

This is related to the patent application Ser. No. 07/646,264, filed Jan. 28, 1991.

BACKGROUND OF THE INVENTION

The present invention relates to devices for filtering particulate matter from the fluid lubricant of an engine, and more particularly concerns the use of magnetic forces in hindering the movement of particulate matter which is magnetically attractive through such filtering devices.

Many magnetic filtering devices have been proposed in the prior art for hindering the movement through an engine lubrication system of particulate matter which is magnetically attractive. Examples of such devices can be found in the following U.S. Letters Patent: U.S. Pat. No. 5,282,963 by Hull et al; U.S. Pat. No. 5,273,648 by Caiozza; U.S. Pat. No. 5,228,990 by Chiang; U.S. Pat. No. 5,089,129 by Brigman; U.S. Pat. No. 5,078,871 by McCready; U.S. Pat. Nos. 5,009,779, 4,642,183 and 4,501,660 by Hebert; U.S. Pat. No. 4,894,153 by Sirdavant; U.S. Pat. No. 4,839,044 by Tomita; U.S. Pat. No. 4,826,592 by Taylor; U.S. Pat. No. 4,629,558 by Garritty; U.S. Pat. No. 4,613,435 by Shoemaker; U.S. Pat. No. 4,450,075 by Krow; U.S. Pat. No. 4,446,019 by Robinson; U.S. Pat. No. 4,218,320 by Liaw; U.S. Pat. No. 4,067,810 by Sullivan; U.S. Pat. No. 4,052,312 by King; U.S. Pat. No. 3,887,469 by Hayashi; and U.S. Pat. No. 3,480,145 by Gladden. While these devices may be suitable for a particular purpose to which they address, it will be apparent to those skilled in the art that said devices would not be as suitable for the purposes of the present invention.

Although these and other such devices now in the prior art have attempted to address the problem of metal particulate matter flowing through an engine lubrication system, they have failed to address the need for such devices to be manufacturable at a cost which would allow their affordable availability to the general consuming public. As well, such devices have generally failed to achieve the replaceable-cost efficiencies available to users of the present invention. These characteristics of such prior art devices have prevented a more extensive use of such devices.

SUMMARY OF THE INVENTION

In view of the foregoing disadvantages inherent in the known types of devices now present in the art, the invention disclosed herein provides an improved magnetic filter adapter for use with filters of a fluid lubrication system. The magnetic filter adapter of the present invention includes means for removably mounting the adapter to the filter, means for magnetically attracting metallic particles from the fluid flow within the filter toward the interior surface of the filter external wall, and means for concentrating the magnetic force of said magnetic means such that the potential field strength of the magnetic means is optimized. Upon a closer review of the more detailed description herein, those skilled in the art will recognize that the concepts of the present invention easily overcome the problems described above which have been heretofore commonly associated with magnetic filter adapter devices. As such, the general purpose of the present invention is to provide a new and improved magnetic filter adapter which has all the advantages of the prior art and none of the disadvantages.

It is an additional object of the present invention to provide a new and improved magnetic filter adapter which enhances the filtering process of lubricating and cooling fluids by removing a significant amount of magnetically attractable particulate matter from said fluids as they engage said filtering process.

It is a further object of the present invention to provide a new and improved magnetic filter adapter which is effective in removing metal particles from lubricating fluids before said fluids reach the mechanical filtering elements of the filtering system, thereby leaving said filtering elements free to trap nonmetallic particles.

It is a further object of the present invention to provide a new and improved magnetic filter adapter which reduces the amount of debris and particulate matter reaching the mechanical filtering elements of the filtering system, thereby prolonging the life of said filtering elements.

It is a further object of the present invention to provide a new and improved magnetic filter adapter which may be manufactured for use with a wide variety of fluid filtering systems.

It is a further object of the present invention to provide a new and improved magnetic filter adapter which is reusable.

It is a further object of the present invention to provide a new and improved magnetic filter adapter which is quickly and easily installed on a filtering system without the need for special tools or skills.

It is a further object of the present invention to provide a new and improved magnetic filter adapter which may be easily cleaned.

It is a further object of the present invention to provide a new and improved magnetic filter adapter which creates an enhanced magnetic circuit when engaged with the metal wall of a filter, such that the field strength of the filter adapter magnet means is optimized.

It is another object of the present invention to provide a new and improved magnetic filter adapter which may be easily and efficiently manufactured, marketed and installed.

It is still a further object of the present invention to provide a new and improved magnetic filter adapter which is of durable and reliable construction.

It is yet still a further object of the present invention to provide a new and improved magnetic filter adapter which meets all federal, state, local and other private standards, guidelines, regulations and recommendations with respect to safety, environmental friendliness, energy conservation, etc.

An even further object of the present invention is to provide a new and improved magnetic filter adapter which is susceptible of a low cost of manufacture with regard to both materials and labor, and which accordingly is then susceptible of low prices of sale to the consuming public, thereby making such a magnetic filter adapter economically available to the buying public.

These together with other objects of the invention, along with the various features of novelty which characterize the magnetic filter adapter of the present invention, are pointed out with particularity in the claims appended hereto and forming a part of this disclosure. The more important objects of the present invention have been outlined rather broadly in order that the detailed description thereof which follows may be better understood, and in order that the present contribution to the art may be better appreciated. For a better understanding of the invention, its operational advantages and the specific objects attained by its uses, reference should be made to the accompanying drawings and descriptive matter in which there are illustrated a preferred embodiment of the invention.

Those skilled in the art will readily ascertain, however, that the invention is capable of other embodiments and of being practiced and carried out in various ways. In this respect, the details of construction disclosed herein, and the arrangements of the components set forth in the following description and appended drawings are for illustrative purposes, only, and are not intended to be limiting in scope. Those skilled in the art will appreciate, as well, that the conception upon which this disclosure is based, may be readily utilized as a basis for the designing of other structures, methods and systems for carrying out the several purposes of the present invention. Said other structures may include, but are not limited to, those which are aesthetic in nature, or those which include the substitution of other materials as they become available, and which substantially perform the same function in substantially the same manner with substantially the same result as the present invention. It is important, therefore, that the claims appended hereto be regarded as including such equivalent structures, constructions, methods and systems insofar as these do not depart from the spirit and scope of the present invention.

BRIEF DESCRIPTION OF THE DRAWINGS

The invention will be better understood and objects other than those set forth above will become apparent when consideration is given to the following detailed description. Such description makes reference to the appended drawings, wherein.

DETAILED DESCRIPTION OF VARIOUS EMBODIMENTS

The present invention comprises an improved magnetic filter adapter for use with removable lubrication system filters, such as those which are typically used with combustion engines. The magnetic filter adapter of the present invention includes an adaptive filter housing removably mountable to a lubrication system filter, magnet means for attracting metallic particles from the fluid flow within the filter toward an interior surface of the filter external wall, and an inner magnetic-field concentrating cup for concentrating the magnetic force of said magnet means such that the potential field strength of the magnetic means is optimized. One embodiment of the instant invention is illustrated in the appended drawings and described in greater detail, below. (All like numerical designations in the figures represent the same element.)

Figure 1:
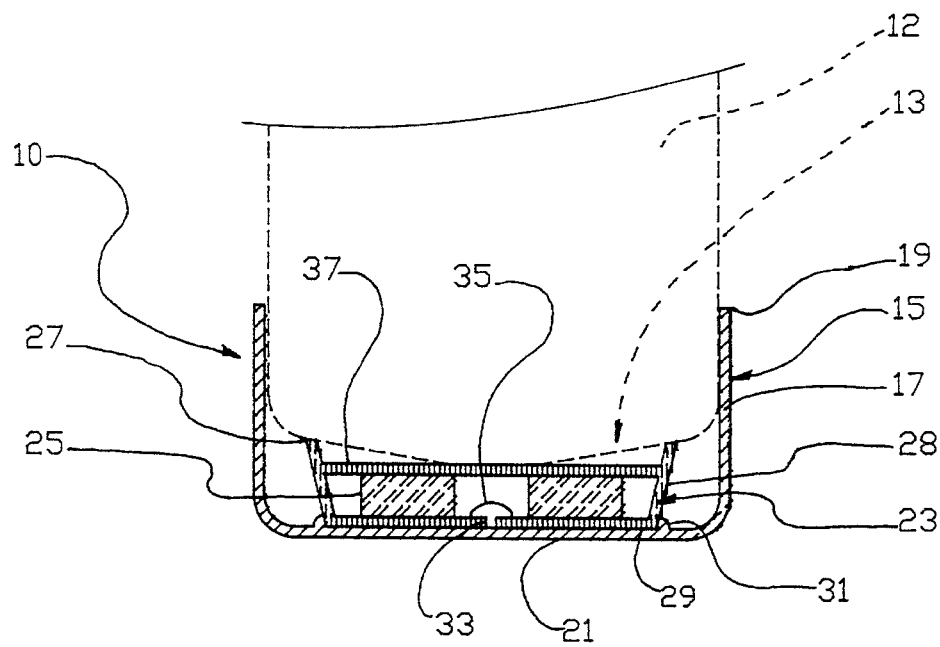
FIG. 1 is a side section view of a preferred embodiment of a magnetic filter adapter according to the present invention.
Figure 2:
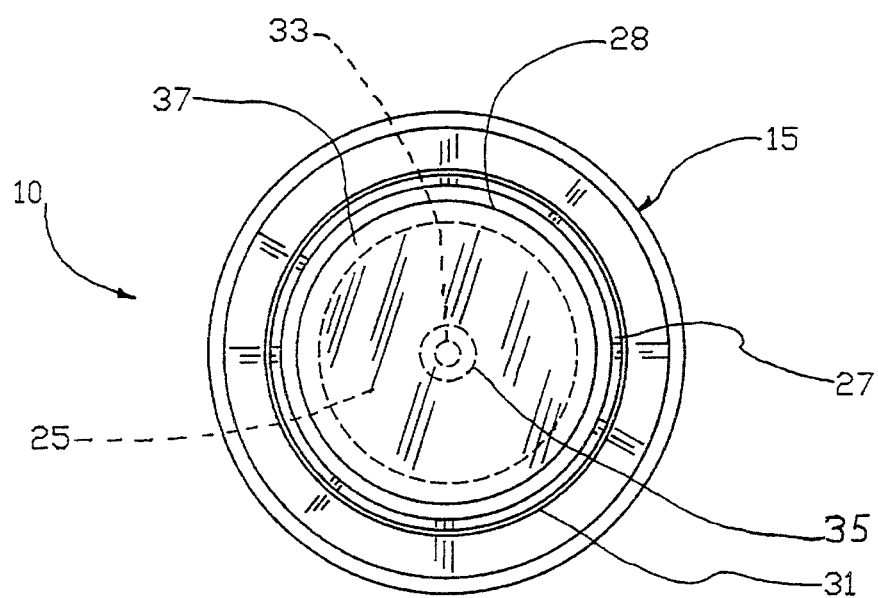
FIG. 2 is a top elevational view of the embodiment of FIG. 1.

FIGS. 1 and 2 illustrate an embodiment of the magnetic filter adapter 10 according to the present invention, for use with a fluid filter 12 (in phantom) having a cylindrical housing which includes a closed end 13 and a semi-open end (not shown) for communicating with a fluid system, such as the lubrication system for a combustion engine. The filter adapter 10 includes a non-magnetic semi-rigid hollow adaptive housing 15, including a cylindrical side wall 17 between a housing open end 19 and a housing closed end 21. An interior diameter and axial height of the housing 15 is sufficient for frictionally engaging the exterior housing surface of the fluid filter 12. The adaptive housing 15 is formed of a resilient polymeric material which is resistant to oil and grease penetration and thermal deformation, such as a synthetic organic plastic selected from the group of linear polymeric amides, trioxane, acetyl resins, polymerized formaldehyde resins, polyethylenes, and polyurethanes. Other types of polymeric material which made be so used include that which is glass impregnated, and latex, although those skilled in the art will be familiar with other materials which may be used just as efficiently in accordance with the present invention.

Further included in the magnetic filter adapter 10 is an inner magnetic-field concentrating cup 23 formed of a material which can be magnetized in the presence of an external magnetic field, such as that which is provided by a magnet 25 affixed within the concentrating cup 23. The concentrating cup may be formed of a ferrous material, for example mild steel, or a ferrous metal alloy. A concentrating cup formed of mild steel may be electroplated with a rust resistant material, for example zinc, or may be galvanized. Said cup 23 includes a cup open end 27, a cup side wall 28 and a cup closed end 29. The concentrating cup 23 further has an exterior diameter which is less than the interior diameter of the adaptive housing 15, and has an axial height which is less than the axial height of the adaptive housing 15. The concentrating cup 23 cup is affixed within the adaptive housing 15 such that the external surface of the cup closed end 29 is substantially in coaxial contact with an inner surface of the adaptive housing closed end 21. The cup open end 27 is in magnetic contact with the fluid filter closed end 13 when the filter 12 is engaged by the adaptive housing 15. A circular cup-retaining flange 31 is further formed on the inner surface of the housing closed end 21 for engaging a periphery of the concentrating cup side wall 28 adjacent said cap closed end 29. The concentrating cup closed end 29 further includes a central axial aperture 33 through which an adaptive housing central affixing plug 35 is positioned, said affixing plug 35 being formed and extending from the center of the inner surface of the adaptive housing closed end 21 for affixing the concentrating cup 23 thereto.

The magnet 25 of the magnetic filter adapter 10 has a pair of opposed ends and a diameter less than the diameter of the concentrating cup 23 and is further affixed within said concentrating cup 23 such that one of said opposed ends of the magnet is in substantially coaxial contact with an inner surface of said closed end 29 cup. The magnet 25 further has a height which is less than the axial height of the concentrating cup 23 such that the other of said opposed ends of the magnet 25 does not contact the fluid filter 12 when said filter is engaged by the adaptive housing 15. It is preferred that the magnet 25 is a disk shaped permanent magnet with a central axial aperture therethrough, although those skilled in the art will recognize that an electromagnet may just as readily be used, said electromagnet having an inner conductive core which is electrically connected to an external power source, such as an engine battery (not shown), via means which are well known. The permanent magnet 25 may be formed of a wide variety of ferromagnetic materials, including ceramic magnetic material such as ferrite and barium or strontium alloys, rare-earth materials from the rare-earth cobalt 5 and the rare-earth 2 transition metal 17 group, an aluminum-nickel alloy and various iron-chromium-cobalt alloys, all of which are well known. A non-magnetic cover plate 37 is affixed to an interior periphery of the side wall 28 of the concentrating cup 23, for covering the magnet 25. In the preferred embodiment, the cover plate 37 is formed of similar material to that of the adaptive housing 15, but other materials which are well known may just as readily be used in accordance with the present invention.

The unique location and size of the magnet 25 in relation to the concentrating cup 23 and the filter 12 prevents direct contact between the filter 12 and the magnet 25. The magnetic circuit between these two elements is closed by contact between the lower closed end surface 13 of the filter 12 and the circular opening of the cup open end 27. With this unique configuration, the magnetic energy of the magnet 25 is concentrated in the specific region of the filter 12 which is in contact with the cup open end 27, which allows the fluid flowing through this end of the filter 12 to be exposed to the full field strength limit of the magnet 25, thereby optimizing the magnetic influence of the magnet 25 upon magnetically attractable particles flowing through the filter 12. Such optimization allows for the use of a much smaller magnet in this process than that which has been previously conceived, thereby making such a magnetic filtering process more widely available to the consuming public.

The particles which are ultimately attracted to the closed end 13 of the filter 12 by the magnet 25 are retained in contact with the interior surface of the closed end 13 until such time as the filter adapter 10 is removed from the filter 12, or, in the case where the magnet 25 is an electromagnet, until such time as when the magnet 25 is disconnected from its source of electric power. It is preferred, therefor, that in the use of the filter adapter 10 when the magnet 25 is a permanent magnet, that said adapter 10 not be removed from the filter 12, until such time as the filter 12 is itself removed from communication with the fluid system to which it is attached for filtering. As well, in the case when the magnet 25 is an electromagnet, it is preferred that the power source to which the electromagnet is connected is a permanent power source, such as a battery, which may not be turned-off until such time as the filter adapter 10 is removed from the filter 12.

The inventor has given a non-limiting description of a preferred embodiment of the present invention, to which many changes may be made without deviating from the spirit of the invention. While this invention has been described with reference to an illustrative embodiment, this description is not intended to be construed in a limiting sense. Various modifications and combinations of the preferred embodiment, as well as other embodiments of this invention, will be apparent to a person skilled in the art upon reference to this description. It is therefore contemplated that the appended claims cover any such modifications and/or embodiments that fall within the true scope of the present invention.

It is claimed:

1. A magnetic filter adapter for use with a fluid filter having a cylindrical housing which includes a closed end and a semi-open end for communicating with a fluid system, the filter adapter comprising:

a non-magnetic semi-rigid hollow adaptive housing, including a cylindrical side wall between a housing open end and a housing closed end, and further having an interior-diameter and an axial height sufficient for frictionally engaging the exterior housing surface of the fluid filter;

an inner magnetic-field concentrating cup formed of a material which can be magnetized in the presence of an external magnetic field, and including a cup open end, a cup side wall and a cup closed end; said cup having an exterior diameter less than the interior diameter of the adaptive housing and further having an axial height which is less than the axial height of the adaptive housing; said cup further being affixed within said adaptive housing such that the external surface of the cup closed end is substantially in coaxial contact with an inner surface of the adaptive housing closed end, and the cup open end is in magnetic contact with the fluid filter closed end when said filter is engaged by the adaptive housing; and a magnet having a pair of opposed ends and a diameter less than the diameter of the concentrating cup and being affixed within said concentrating cup such that one of said opposed ends of the magnet is in substantially coaxial contact with an inner surface of said cup closed end; said magnet further having a height which is less than the axial height of said concentrating cup such that the other of said opposed ends does not contact the fluid filter when said filter is engaged by the adaptive housing.

2. The magnetic filter adapter as recited in claim 1, further comprising a circular cup retaining flange formed on the inner surface of the housing closed end for engaging a periphery of the concentrating cup side wall adjacent said cup closed end.

3. The magnetic filter adapter as recited in claim 1, further comprising a non-magnetic cover plate affixed to an interior periphery of the side wall of the concentrating cup, for covering the magnet.

4. The magnetic filter adapter as recited in claim 1, wherein the concentrating cup closed end further includes a central axial aperture through which an adaptive housing central affixing plug is positioned, said affixing plug being formed and extending from the center of the inner surface of the adaptive housing closed end for affixing the concentrating cup thereto.

5. The magnetic filter adapter as recited in claim 1 wherein the concentrating cup is formed of a ferrous metal or a ferrous metal alloy.

6. The magnetic filter adapter as recited in claim 5, wherein the ferrous metal is mild steel.

7. The magnetic filter adapter as recited in claim 6, wherein the mild steel is electroplated with a rust resistant material.

8. The magnetic filter adapter as recited in claim 7, wherein the rust resistant material is zinc.

9. The magnetic filter adapter as recited in claim 6, wherein the mild steel is galvanized.

10. The magnetic filter adapter as recited in claim 1 wherein the adaptive housing is formed of a resilient polymeric material which is resistant to oil and grease penetration and thermal deformation.

11. The magnetic filter adapter as recited in claim 10, wherein the polymeric material is a plastic.

12. The magnetic filter adapter as recited in claim 11, wherein the plastic is a synthetic organic plastic selected from the group of linear polymeric amides, trioxane, acetyl resins, polymerized formaldehyde resins, polyethylenes, and polyurethanes.

13. The magnetic filter adapter as recited in claim 10, wherein the polymeric material is further fiberglass impregnated.

14. The magnetic filter adapter as recited in claim 10, wherein the polymeric material is a latex.

15. The magnetic filter adapter as recited in claim 1, wherein the magnet is an electro-magnet.

16. The magnetic filter adapter as recited in claim 1, wherein the magnet is a permanent magnet which is disk shaped and having a central axial aperture therethrough.

17. The magnetic filter adapter as recited in claim 16, wherein the permanent magnet is formed of a ceramic magnetic material.

18. The magnetic filter adapter as recited in claim 16, wherein the permanent magnet is formed of an aluminum-nickel alloy.

19. The magnetic filter adapter as recited in claim 16, wherein the permanent magnet is formed of a rare-earth magnetic material.

20. The magnetic filter adapter as recited in claim 16, wherein the permanent magnet is formed of an iron-chromium-cobalt alloy.

\* \* \* \* \*